(12) United States Patent
Haartsen

(10) Patent No.: US 6,473,412 B1
(45) Date of Patent: Oct. 29, 2002

(54) UNCOORDINATED FREQUENCY HOPPING CELLULAR SYSTEM

(75) Inventor: Jacobus C. Haartsen, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/272,212

(22) Filed: Mar. 19, 1999

Related U.S. Application Data

(60) Provisional application No. 60/080,607, filed on Apr. 3, 1998.

(51) Int. Cl.[7] .................................................. H04Q 7/00
(52) U.S. Cl. ..................... 370/331; 375/132; 455/437; 455/525
(58) Field of Search ................................ 455/436, 437, 455/440, 443, 456, 524, 525; 370/331, 332, 328; 375/132

(56) References Cited

U.S. PATENT DOCUMENTS 5,606,560 A    2/1997  Malek et al.
5,940,431 A  * 8/1998  Haartsen et al. ............ 375/202
5,896,375 A  * 4/1999  Dent et al. .................. 370/347
6,138,019 A  * 10/2000 Trompower et al. ........ 455/436

FOREIGN PATENT DOCUMENTS

GB    2 313 984 A    12/1997

* cited by examiner

*Primary Examiner*—Nguyen T. Vo
(74) *Attorney, Agent, or Firm*—Burns, Doane, Swecker & Mathis, L.L.P.

(57) ABSTRACT

An uncoordinated frequency hopping cellular system includes a mobile unit and a number of base stations. The mobile unit determines which base stations are in a geographical location defined by a location of the mobile unit. This determination is made by transmitting one or more inquiry messages, and receiving response information transmitted by responding base stations. The mobile unit then selects, for use by the mobile unit, one of the base stations from the set of base stations. Each of the base stations receives at least one of the inquiry messages, and transmits the response information to the mobile unit in response to the at least one received inquiry message. The mobile unit determines synchronization information from the response information, and uses this to establish communication with the selected base station.

15 Claims, 8 Drawing Sheets

Fig. 7

| identity | clock offset | RSSI |
|---|---|---|
| BS1 | -2030 | -60 dBm |
| BS2 | +10 | -72 dBm |
| BS3 | -190 | -90 dBm |
| BS4 | -1 | - |
| BS5 | +130 | - |

UNCOORDINATED FREQUENCY HOPPING CELLULAR SYSTEM

REFERENCE TO CO-PENDING APPLICATIONS

This application claims the benefit of U.S. Provisional Application No. 60/080,607, filed Apr. 3, 1998, which is hereby incorporated by reference herein in its entirety.

BACKGROUND

The invention relates to frequency hopping (FH) radio systems. In particular, it relates to FH radio systems applied in a multi-cell or cellular application comprising fixed base stations and moving portables that while moving, connect from one base station to the other. The invention enables handovers to take place between FH base stations even if the base stations are by no means coordinated.

Since the widespread use of mobile telephony, cellular systems are well known and have reached a high level of maturity. Cellular systems typically comprise a mobile network with a number of base stations located at strategic positions, each base station covering a restricted area called a cell. Because adjacent cells partly overlap, a portable device can move from one cell to the other without losing contact with the mobile network. As the portable moves during a call, the connection is handed off from one base station to another, depending on the relative location of the portable with respect to the base stations.

To support the access to the network and the handover function, the base station typically transmits a predefined (known) radio signal, the so-called control channel or beacon. The control channel reveals the presence of the base station to the portable. Based on the signal strength of the control channel received in the portable, a decision can be made regarding which base station the portable should connect to before or during a call.

Control channels are fixed channels that can easily be found by the portables. They either use a dedicated frequency and/or time slot in Frequency Division Multiple Access (FDMA)- /Time Division Multiple Access (TDMA)-based systems, or a fixed spreading code in direct-sequence Code Division Multiple Access (CDMA)-based systems. In all cases, the carrier frequency on which the control channel is located is fixed, although it can differ per base station. All the portable has to do is to tune to the proper carrier frequency and scan the signals until a decodeable signal is found.

In systems based on frequency-hop CDMA, the situation is completely different. In these systems, the carrier frequency changes periodically according to a pseudo-random hop sequence. Therefore, it is difficult to build cellular systems with a FH system because FH control channels are difficult for the portable to find, especially when the portable has no knowledge of the hop timing and the hop sequence. In the past, FH has been applied in digital cellular systems like GSM in order to increase capacity through interference diversity; however, in these systems, it is only the traffic channels that hop, and never the control channels.

The search effort of a portable in a FH cellular system can be reduced considerably if the hopping between the base stations is coordinated. In this case, once the portable has synchronized to one base station, little effort is required to lock to other, nearby base stations, provided that their FH transmissions are coordinated with the current base station. Thus, the search effort in coordinated systems is only expended the first time the portable enters the mobile network, such as at power up when turning on the portable.

However, when the radio interface uses certain frequency bands, regulations and rules set by regulatory bodies, like the FCC in the U.S. or the ETSI in Europe, prohibit the coordination of base stations. An example is the unlicenced Industrial/Medical/Scientific (ISM) band at 2.4 GHz. To use this band, the radio system must spread its signals either by direct-sequence (DS) spreading, or by frequency-hop spreading. As was described above, cellular systems based on DS spreading are attractive to use because fixed carrier frequencies can be used to support the control channels. However, FH spreading is more robust in environments with unknown jammers and results in cheaper transceiver implementations. Unfortunately, the set of rules governing the ISM band do not permit the coordination of FH base stations. This hinders the deployment in this band of multi-cell and cellular FH systems that support, for example, handovers.

Even if a radio band is used in which regulations allow coordination of base stations, for low cost solutions coordination is undesirable. Base stations being used as access pints for wireless access to an existing wired network like PSTN, Ethernet, or any other conventional LAN, cannot rely on coordination and synchronization signals on the wireline. In such a case, a dedicated network would be required to deal with the mobility functions required by the access points. This is not an attractive solution. In the preferred case, an access point can be plugged in to a conventional wired backbone without requirements for coordination and synchronization signals.

It is therefore desirable to provide a system and method that applies frequency hopping in a communications system that performs handovers between uncoordinated base stations.

SUMMARY

It is therefore an object of the invention to provide an uncoordinated frequency hopping cellular system, a mobile unit for use in an uncoordinated frequency hopping cellular system, and methods for operating the mobile unit and the system.

In accordance with one aspect of the invention, a mobile unit determines which base stations are in a geographical location defined by a location of the mobile unit. The determination is made by transmitting one or more inquiry messages from the mobile unit; and receiving response information transmitted by responding base stations. The mobile unit then determines a set of base stations that are in the geographical location. One of the base stations from the set of base stations may then be selected for use by the mobile unit.

In another aspect of the invention, base stations in the uncoordinated frequency hopping system receive at least one of the inquiry messages, and transmit the response information to the mobile unit in response to the at least one received inquiry message.

In still another aspect of the invention, the mobile unit determines synchronization information from the response information, and uses the synchronization information to establish communication with the selected base station.

In yet another aspect of the invention, the acts of determining which base stations are in a geographical location defined by a location of the mobile unit; determining a set of base stations that are in the geographical location; and selecting, for use by the mobile unit, one of the base stations from the set of base stations are performed as part of a handover procedure.

In still another aspect of the invention, the mobile unit determines synchronization information from the response information received from at least one of the base stations; and utilizes the synchronization information to monitor a frequency hopping beacon that is transmitted by said at least one of the base stations.

In yet another aspect of the invention, at least one of the base stations in the uncoordinated frequency hopping system transmits the frequency hopping beacon.

BRIEF DESCRIPTION OF THE DRAWINGS

The objects and advantages of the invention will be understood by reading the following detailed description in conjunction with the drawings in which:

FIG. 7 shows an exemplary inquiry result list of a portable unit in a multi-cell environment, in accordance with an aspect of the present invention.

DETAILED DESCRIPTION

Figure 1:
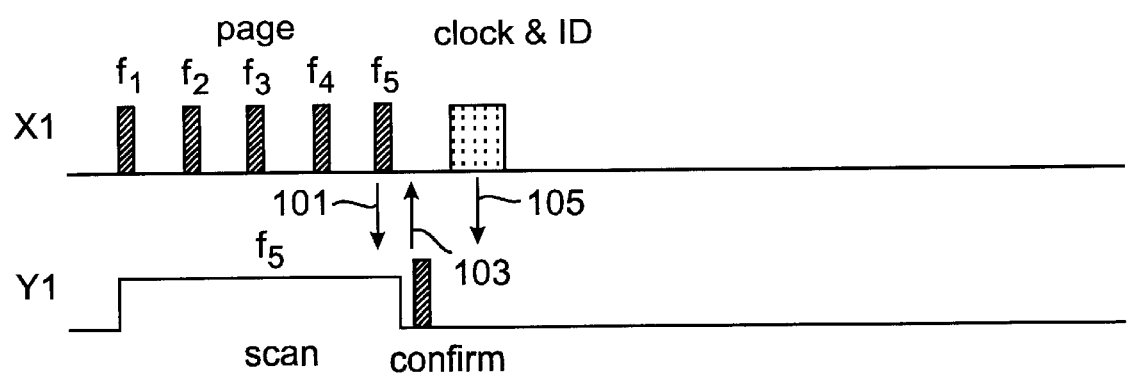
FIG. 1 depicts a paging procedure between two units in a frequency hopping communication system.

The various features of the invention will now be described with respect to the figures, in which like parts are identified with the same reference characters.

A preferred embodiment of the system described herein utilizes the FH radio air interface as described in U.S. patent application Ser. No. 08/685,069, ("Short-range radio communications system and method of use," by P. W. Dent and J. C. Haartsen), filed Jul. 23, 1996, and the method of channel access described in U.S. patent application Ser. No. 08/771,692, ("Access technique of channel hopping communications system," by J. C. Haartsen and P. W. Dent), filed Dec. 23, 1996. The U.S. patent application Ser. Nos. 08/685, 069 and 08/771,692 are hereby incorporated herein by reference. The considered air interface describes a so-called time-division duplex physical interface in which the transceiver alternately transmits and receives in order to support a duplex link. In addition, each time slot is transmitted at a different hop frequency according to a pseudo-random hop pattern. The hop pattern is determined by the identity of one of the units participating in the link. The phase in the hop pattern is determined by the native, system clock of that same unit. During connection setup, the identity and clock information are transferred from one unit to the other unit so that both can use the same hopping pattern and phase and thus stay in synchrony.

A unit in standby wakes up at regular intervals to scan for page messages. The hop frequency in which the unit wakes up is different for each new wake-up interval but is constant for the duration of the wake up interval. A unit that wants to connect to the unit in standby transmits the page message sequentially on a large number of different hop frequencies. It will first try on the frequencies close to the frequency it anticipates the unit in standby to wake up in. If no response is experienced, it will probe frequencies further away from the anticipated frequency. The anticipated frequency is obtained from a previous connection or a previous inquiry process. When the two units are connected, they then have accurate knowledge of each other's system clocks. The clock offsets are stored before disconnection so that they may be used for a later page attempt. In particular, the clock value of the other unit may be derived by adding the offset to the native system clock. Together with the identity which determines the hopping sequence, the two units can then quickly connect. After disconnection, the accuracy of the clock estimate depends on clock drifts. The larger the clock drift, the larger the uncertainty, and the longer it will take for a unit to connect to another unit.

Referring now to the exemplary signaling depicted in FIG. 1, once a page arrives at the recipient (step 101), the recipient returns a confirmation (step 103). Upon receipt of this confirmation, the paging unit sends a message including the paging unit's identity and system clock (step 105). Upon receipt of this information, the recipient uses the identity and the clock values to synchronize to the paging unit and continue the connection. A more detailed description of the access procedure is described in the above-referenced U.S. patent application Ser. No. 08/771,692.

Figure 2:
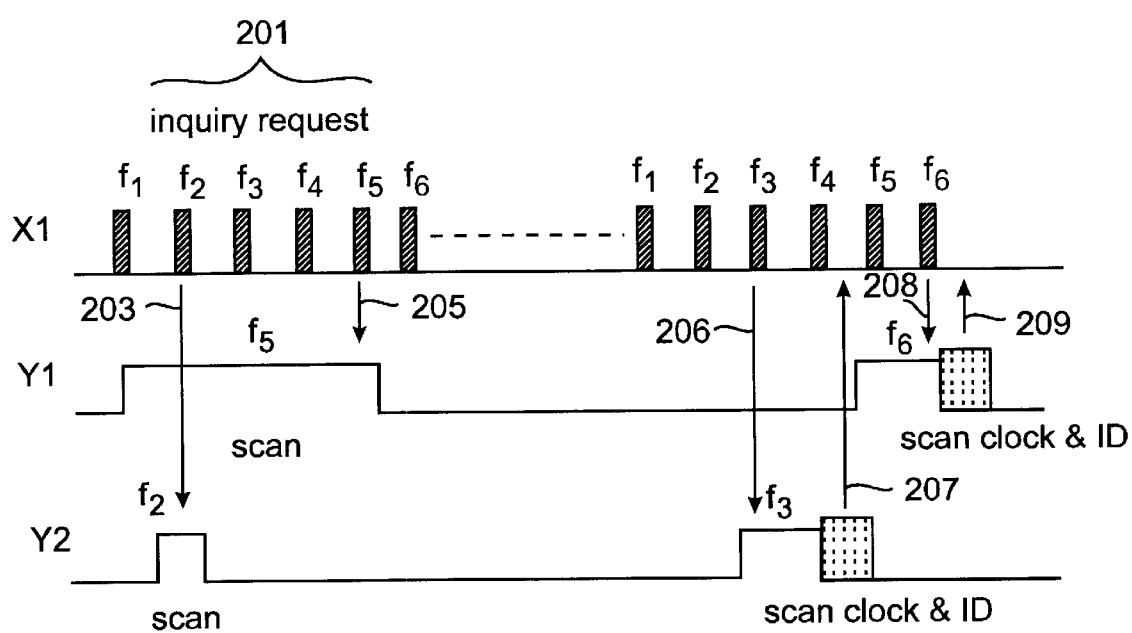
FIG. 2 depicts an inquiry procedure in accordance with one aspect of the present invention.

Based on the access procedure as described in the above-referenced U.S. patent application Ser. No. 08/771,692, an inquiry procedure will now be described with reference to FIG. 2. In some respects, the inquiry procedure is similar to the paging procedure, although there are also important distinctions. The inquiring unit X1 transmits an inquiry request message sequentially on all hop frequencies (step 201). If the message reaches a recipient (e.g., either of the messages 203, 205 reaching the respective units Y1 or Y2), the recipient (Y1, Y2) will start a procedure to respond with a message containing the recipient's identity and clock. This is the opposite of what happens in the paging procedure, in which it is the recipient that receives a message containing the pager's identity and clock values. During the inquiry procedure, the inquirer X1 receives many responses, in principle from all units in range. In preferred embodiments, a procedure is included to prevent two recipients from transmitting simultaneously and thus colliding at the receiver of the inquirer X1. Upon reception of the first inquiry request message (e.g., steps 203, 205), the recipient waits a random time interval before it listens for inquiry request messages again. When the recipient (e.g., Y1 and/or Y2) listens again after the random waiting period and receives the inquiry request message for the second time (this time on a next frequency in the respective hopping sequence) (steps 206, 208), it responds directly to the inquirer X1 with a message containing its identity and clock values (steps 207 and/or 209). Because the waiting time is randomized, the return messages are randomized, which reduces the probability that return messages of different recipients will collide.

Figure 3:
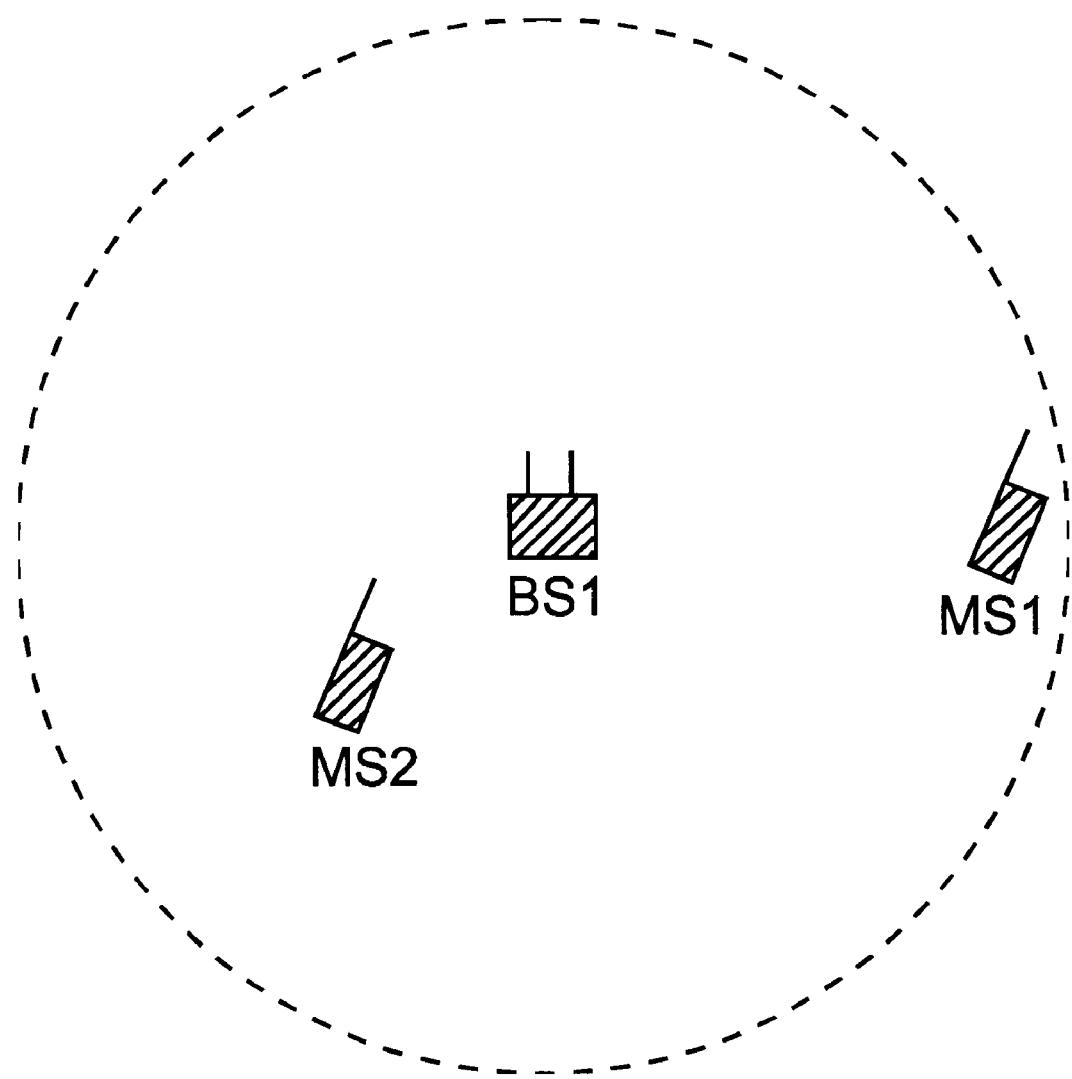
FIG. 3 depicts a conventional single-cell system in which a fixed cell is determined by the range of base station's control channel.

The concept of paging and inquiry as described above and in the above-referenced documents will now be used to construct a single-cell and multi-cell wireless system. A conventional single-cell wireless system is shown in FIG. 3. It consists of a base station BS1 at a fixed location. This base station is connected to a wired network, such as a PSTN or ISDN network (not shown). To reveal its presence to moving terminals, the base station transmits a beacon or control channel. A terminal (e.g., either of the mobile stations MS1 or MS2) roaming around within the coverage area of the base station BS1 periodically scans for the beacon. Once in range of the base station, it locks to the beacon and "camps" on the cell.

Figure 4:
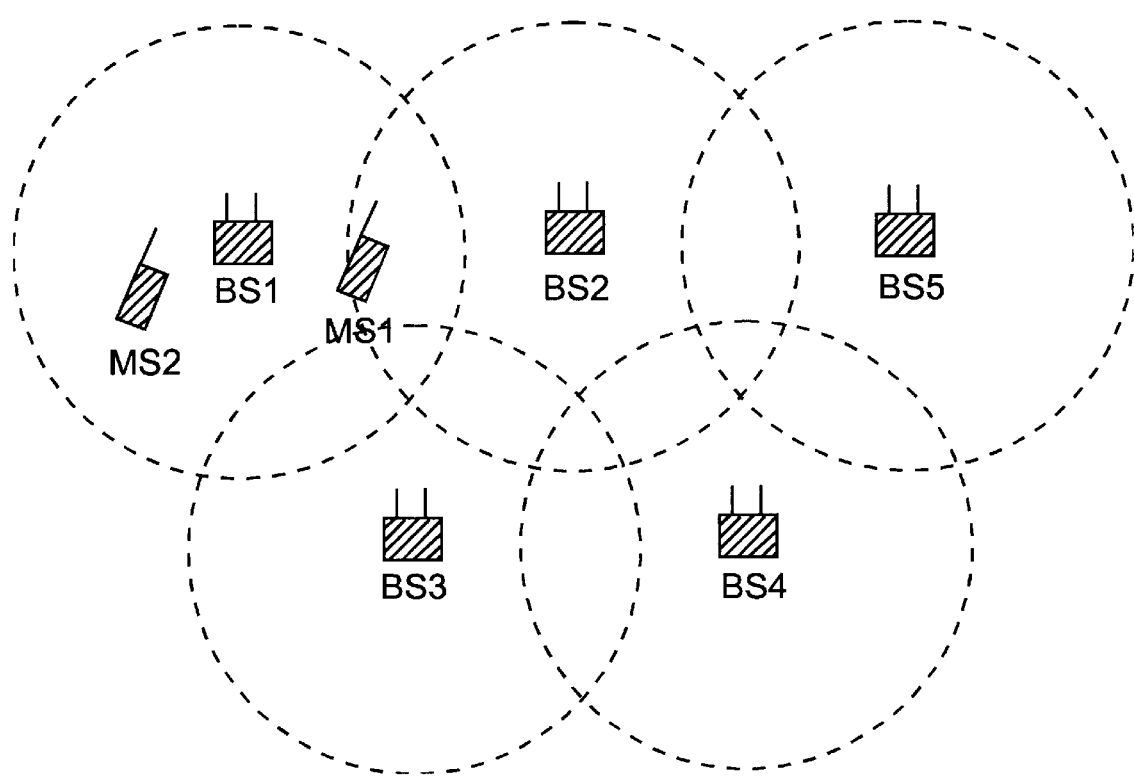
FIG. 4 depicts a conventional multi-cell system in which fixed cells are determined by the range of each base station's control channel.

FIG. 4 depicts the situation in a multi-cell environment. Basically, the same procedures are used. Multiple base stations (BS1, BS2, BS3, BS4, BS5) cover an area, with each base station defining its own cell as depicted by the dashed lines in FIG. 4. A terminal roaming within the covered area scans for the beacon or control channels transmitted by the base stations and typically camps in the cell whose base station signal is received the strongest. For example, the mobile terminal MS2 might camp on BS1. Another mobile terminal MS1 is in the service area of two base stations, namely BS1 and BS2, and can therefore choose to camp on either of BS1 or BS2. Assuming that BS1's signal is received stronger than BS2's signal, the mobile terminal MS1 will choose to camp on BS1. When the terminal is in connection with one base station but moves into the cell of an adjacent base station (e.g., the terminal MS1 may be moving from the coverage area of BS1 to the coverage area of BS2), the current base station BS1 can handover the connection to the new base station (BS2). Usually, interaction of the terminal is required to initiate a contact to the new base station. Before that, it already has locked to the control channel of the new base station. So during a handover, the terminal is locked to both base stations for a short time.

As was described in the background section, problems arise if the control channel or beacon hops in the frequency domain. In that case, it takes quite some effort of the terminal to find the beacon. This problem can be solved by using the paging and inquiry techniques as described above. In alternative embodiments of the invention, the base station either does not transmit anything, or else it transmits a beacon at a very low duty cycle (this beacon can be used to lock or "park" low-power devices, see also U.S. Provisional Application No. 60/071,262, filed on Jan. 13, 1998 and entitled "Central multiple access control for FH radio network," by J. C. Haartsen and J. Elg, which is hereby incorporated herein by reference). In either case, the terminal finds the base station by sending an inquiry request. Upon receipt of the inquiry response message from the base station, the terminal has full knowledge of the base station's identity and timing (e.g., clock value) and can quickly access the base station via a page from terminal to base station. When contact is made, the base station can inform the terminal of the low duty cycle FH beacon channel supported by the base station, if any. When no connection is desired, the terminal can be released and permitted to return to the idle mode. If the base station supports a beacon channel, the terminal now has all the knowledge necessary for locking onto this beacon while in idle mode.

Figure 5:
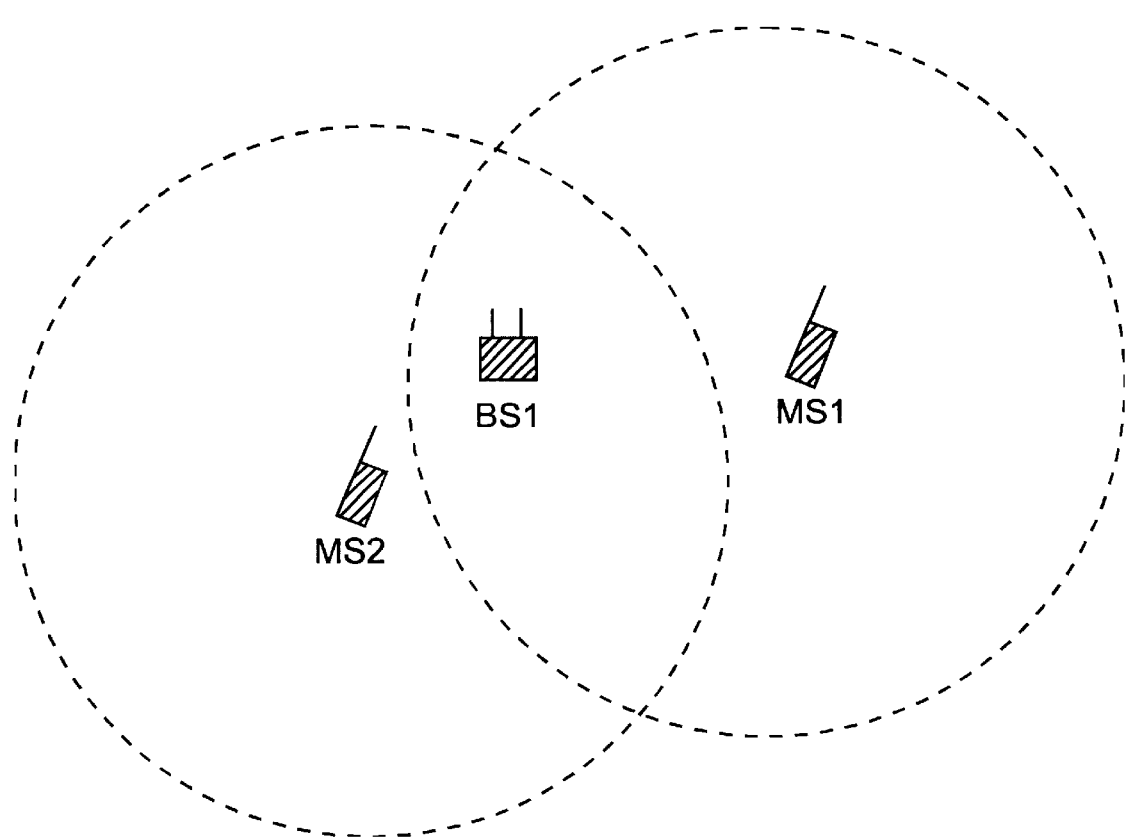
FIG. 5 depicts a single cell system in accordance with an embodiment of the invention, whereby a floating cell is determined by the range of the portable unit's inquiry signal.

An exemplary single-cell system according to the invention is shown in FIG. 5. The range of the inquiry message from the terminals MS1 and MS2 determines the "floating" cells around the terminals. So in this case, it is not the base station that defines the cell, but the terminal. Because, in this example, there are two such floating cells, it is better to speak of a single-base system, rather than a single-cell system. If a base station is inside the cell of the terminal (e.g., the BS1, which is located in each of the floating cells respectively defined by terminals MS1 and MS2), it will respond to an inquiry message. The terminal (MS1, MS2) then obtains the identity and clock of the base station (BS1). With this information, the terminal (MS1, MS2) can quickly access the base station (BS1). If the base station BS1 transmits a low duty cycle beacon, the terminal (MS1, MS2) can also follow this beacon and thereby "lock on" to this base station, as in conventional systems. A roaming terminal according to this concept periodically sends out an inquiry message.

In another aspect of the invention, once a response from a proper base station is returned, the terminal can store the base identity and clock offset for later use, and, if the base station transmits a low-duty cycle beacon, lock to the beacon. If no beacon is provided, the terminal has to periodically retransmit inquiry messages to see if the base station is still in range.

Figure 6:
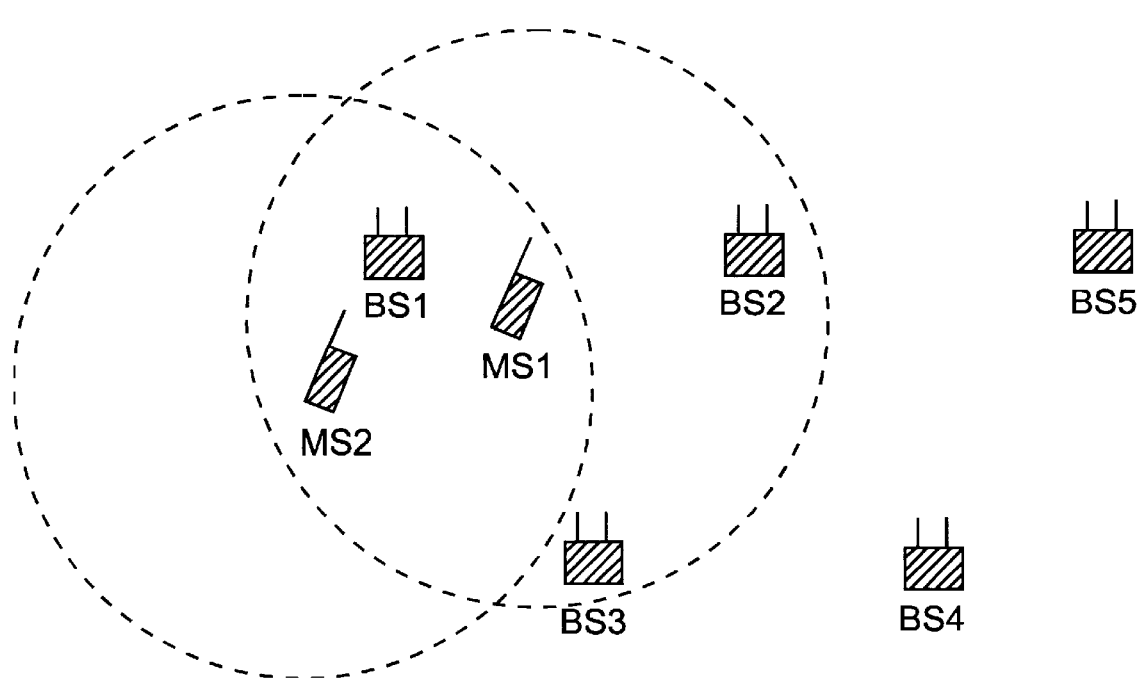
FIG. 6 depicts a multi-cell system in accordance with an embodiment of the invention, whereby a floating cell is determined by the range of the portable unit's inquiry signal.

In a multi-base environment, such as the exemplary system shown in FIG. 6, more than one base station is in range of the terminal. For example, the terminal MS1 has three base stations (BS1, BS2, BS3) within the coverage area of its floating cell. Consequently, after transmitting an inquiry message, several base stations (in fact all the base stations in the terminal's floating cell) will respond. The terminal stores all identities and all clock offsets of the responding base stations. Note that the base stations do not have to be coordinated or synchronized with respect to one another: as long as the base stations and the terminals nominally have the same clock rate, the offsets together with one native clock (e.g., the clock of the terminal), provides sufficient information in the terminal to be able to access all the base stations in range.

FIG. 7 depicts an example of the list of base station information stored in the exemplary terminal MS1 of FIG. 6. Base stations BS1, BS2 and BS3 are in range, and their identity, clock offset, and RSSI are given. Base stations BS4 and BS5 are not in range, but for purposes of this example they responded in a previous inquiry procedure, so that the terminal MS1 is aware of their existence, and has accordingly saved their identities and their clock offset values. The present RSSI values for these base stations BS4 and BS5 are too low to be important: base stations BS4 and BS5 are outside the range of the terminal.

The terminal has to repeat the inquiry procedure periodically to find out whether base stations have entered or left the terminal cell due to terminal displacement. In embodiments in which the base stations do not transmit a beacon, prior to a call setup, the terminal has to issue an inquiry to determine which base station is closest, based on received signal strength indication (RSSI). However, if the base stations transmit a low duty cycle, FH beacon, preferably uncoordinated as for example required in the 2.4 GHz ISM band, the terminal can monitor each base station by tuning to it for a short moment when the beacon is transmitted. The terminal can then adjust the offset (to correct for clock drift) and monitor the RSSI. At call setup, the terminal can then select the base station which has had the largest RSSI.

The same procedures can be carried out during an existing connection when a handover from one base station to another base station is required. When the current connection deteriorates, the terminal issues an inquiry to find new and better base stations in its cell. If beacons are available, the monitoring of beacons can be continued during the call and can give an indication of whether it is now better to connect to another base station. However, the transmission of inquiry messages remains important in order to discover new base stations.

Figure 8:
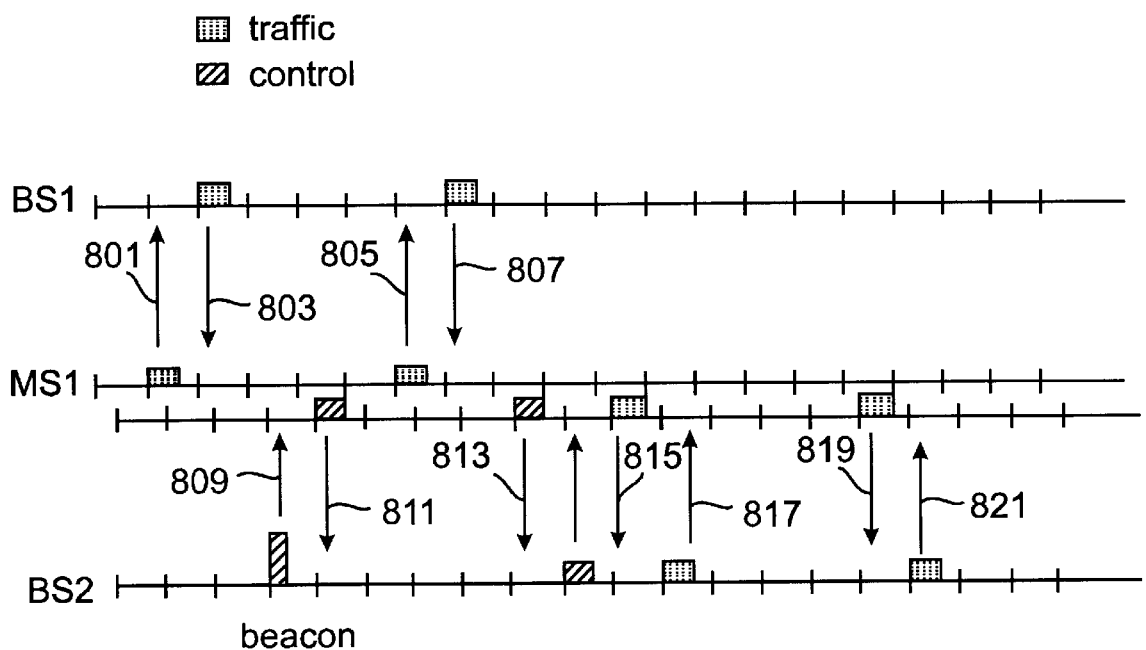
FIG. 8 is a diagram depicting an example of the timing and direction of signals over the air interface during handover in accordance with an aspect of the present invention.

With the air interface based on FH and time slots, the terminal can maintain a connection to a current base station while inquiring and connecting to another base station. This is illustrated in FIG. 8. In this case, a duplex traffic connection is presented by exchanging a forward and return packet every 6 slots. The traffic packets are indicated by the shaded rectangles. In the slots that are not used for traffic, the terminal MS1, which in this example is currently connected to BS1 (e.g., see the traffic communicated at steps 801, 803, 805 and 807), can inquire or monitor other base stations. In this case, MS1 has monitored BS2; just after the beacon received from BS2 (step 809), MS1 transmits an access request to BS2 (step 811) (control packets are indicated by black rectangles). When MS1 is ready, the traffic connection is handed over from BS1 to BS2. In this case, BS2 waits until MS1 is ready to do the handover (e.g., step 813). After handover, traffic packets are then exchanged between MS1 and BS2 (e.g., steps 815, 817, 819, 821).

In summary then, the described system uses base stations which either do not transmit a beacon or control channel at all, or alternatively transmit a FH beacon at a very low duty cycle. The portable unit moving in the area covered by the base stations (or alternatively viewed as those base stations coming within range of the portable unit's own floating cell) repeatedly inquires after the status of its environment, for the purpose of discovering which base stations are in range and what their status is. During the inquiry process, the portable unit obtains information regarding the hopping pattern and the phase in this hopping pattern for each base station in range. In preferred embodiments, the hopping pattern is based on the identity of the base station, and the phase in the hopping sequence is based on a free running clock in the base station. If the portable obtains the clock of the base station and stores it as an offset to its own clock, it remains in synchrony to this base station as long as the clocks in the portable and the base station run in synchrony. In order to adjust for clock drifts, the clock offset must be adjusted periodically. By the inquiry procedure, the portable can obtain all the addresses and clock offsets of the base stations in range. The base stations themselves do not have to be coordinated; the only requirement is that all units (portables and base stations) use the same nominal clock rate.

If the base stations transmit a FH beacon, the portable unit can monitor the base stations using the synchronization information obtained during the inquiry procedure. It can then constantly adjust the clock offset to correct for clock drift, and can track the signal level at which this base station is received. If the base station does not send a beacon at all, the inquiry process should be carried out more frequently.

In some respects, the described concept can be considered as a reverse action to the one carried out in conventional cellular systems. In cellular systems, the network builds cells; the transmission of the base stations defines the cells. In the system according to this invention, the cells are determined by the portable, which finds out which base stations are in range and are present in its own "floating" cell. Therefore, the portable regularly transmits a signal to discover new base stations in its cell. By means of the inquiry process, the portable obtains a picture of how many base stations are present in its floating cell, and at what distance these base stations are located. If the base station sends a (FH) beacon, the portable unit can also monitor the base stations in-between inquiry procedures.

The inquiry and monitoring should be carried out more frequently during a connection in order to perform a handover in time before the current base station leaves the cell of the portable.

The advantages with this concept are 1) the base stations do not have to be coordinated, and 2) little capacity is wasted and unnecessary interference is avoided because the base stations not supporting a portable either do not transmit, or otherwise transmit at very low duty cycle.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A mobile unit for use in an uncoordinated frequency hopping cellular system, the mobile unit comprising:
    wireless means for determining which base stations are in a geographical location defined by a location of the mobile unit, the wireless means comprising:
        means for transmitting one or more inquiry messages; and
        means for receiving response information transmitted by responding base stations;
    means for determining a set of base stations that are in the geographical location; and
    means for selecting, for use by the mobile unit, one of the base stations from the set of base stations.

2. The mobile unit of claim 1, further comprising:
    means for determining synchronization information from the response information; and
    means for utilizing the synchronization information to establish communication with the selected base station.

3. The mobile unit of claim 2, wherein the means for determining synchronization information determines a clock offset value.

4. The mobile unit of claim 3, wherein the means for determining synchronization information further determines an identity of the selected base station.

5. The mobile unit of claim 1, further comprising:
    means for determining synchronization information from the response information received from at least one of the base stations; and
    means for utilizing the synchronization information to monitor a frequency hopping beacon that is transmitted by said at least one of the base stations.

6. An uncoordinated frequency hopping cellular system, comprising:
    a mobile unit comprising:
        wireless means for determining which base stations are in a geographical location defined by a location of the mobile unit, the wireless means comprising:
            means for transmitting one or more inquiry messages; and
            means for receiving response information transmitted by responding base stations;
        means for determining a set of base stations that are in the geographical location; and
        means for selecting, for use by the mobile unit, one of the base stations from the set of base stations; and
    one or more base stations, each comprising:
        means for receiving at least one of the inquiry messages; and
        means, responsive to the received at least one inquiry message, for transmitting the response information to the mobile unit.

7. The system of claim 6, wherein:

the mobile unit further comprises:

means for determining synchronization information from the response information; and means for utilizing the synchronization information to establish communication with the selected base station.

8. The system of claim 6, wherein:

at least one of the base stations further comprises:

means for transmitting a frequency hopping beacon; and the mobile unit further comprises:

means for determining synchronization information from the response information received from said at least one of the base stations; and means for utilizing the synchronization information to monitor a frequency hopping beacon that is transmitted by said one of the base stations.

9. A method for operating a mobile unit for use in an uncoordinated frequency hopping cellular system, the method comprising:

determining which base stations are in a geographical location defined by a location of the mobile unit, wherein the determination is made by:

transmitting one or more inquiry messages from the mobile unit; and receiving response information transmitted by responding base stations;

determining a set of base stations that are in the geographical location; and selecting, for use by the mobile unit, one of the base stations from the set of base stations.

10. The method of claim 9, further comprising the steps of:

determining synchronization information from the response information; and utilizing the synchronization information to establish communication with the selected base station.

11. The method of claim 9, wherein the steps of determining which base stations are in a geographical location defined by a location of the mobile unit, determining a set of base stations that are in the geographical location; and selecting, for use by the mobile unit, one of the base stations from the set of base stations are performed as part of a handover procedure.

12. The method of claim 9, further comprising the steps of:

determining synchronization information from the response information received from at least one of the base stations; and utilizing the synchronization information to monitor a frequency hopping beacon that is transmitted by said at least one of the base stations.

13. A method of operating an uncoordinated frequency hopping cellular system, the method comprising the steps of:

in a mobile unit:

determining which base stations are in a geographical location defined by a location of the mobile unit, the determination being performed by:

transmitting one or more inquiry messages; and receiving response information transmitted by responding base stations;

determining a set of base stations that are in the geographical location; and selecting, for use by the mobile unit, one of the base stations from the set of base stations; and in each of one or more base stations:

receiving at least one of the inquiry messages; and transmitting the response information to the mobile unit in response to the at least one received inquiry message.

14. The method of claim 13, wherein:

the mobile unit further performs the steps of:

determining synchronization information from the response information; and utilizing the synchronization information to establish communication with the selected base station.

15. The method of claim 13, wherein:

at least one of the base stations further performs the step of:

transmitting a frequency hopping beacon; and the mobile unit further performs the steps of:

determining synchronization information from the response information received from said at least one of the base stations; and utilizing the synchronization information to monitor a frequency hopping beacon that is transmitted by said one of the base stations.

* * * * *